United States Patent
Wu

(10) Patent No.: US 12,047,176 B2
(45) Date of Patent: Jul. 23, 2024

(54) WIRELESS COMMUNICATION DEVICE, WIRELESS COMMUNICATION SYSTEM, AND WIRELESS COMMUNICATION METHOD

(71) Applicant: FUJITSU LIMITED, Kawasaki (JP)

(72) Inventor: Jianming Wu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 252 days.

(21) Appl. No.: 17/861,600

(22) Filed: Jul. 11, 2022

(65) Prior Publication Data

US 2022/0345248 A1 Oct. 27, 2022

Related U.S. Application Data

(63) Continuation of application No. PCT/JP2020/001786, filed on Jan. 20, 2020.

(51) Int. Cl.
*H04L 1/18* (2023.01)
*H04W 88/04* (2009.01)

(52) U.S. Cl.
CPC .............. *H04L 1/18* (2013.01); *H04W 88/04* (2013.01)

(58) Field of Classification Search
None
See application file for complete search history.

(56) References Cited

U.S. PATENT DOCUMENTS

2009/0245275 A1 10/2009 Eguchi
2011/0136531 A1 6/2011 Kobayashi
(Continued)

FOREIGN PATENT DOCUMENTS

JP 2007-266876 A 10/2007
JP 2009-253382 A 10/2009
(Continued)

OTHER PUBLICATIONS

3GPP TS 22.186 V16.2.0, 3rd Generation Partnership Project; Technical Specification Group Services and System Aspects; Enhancement of 3GPP support for V2X scenarios; Stage 1 (Release 16), Jun. 2019.
(Continued)

*Primary Examiner* — Anh Vu H Ly
(74) *Attorney, Agent, or Firm* — Myers Wolin, LLC

(57) ABSTRACT

A wireless communication device includes: a reception controller that receives a signal transmitted to a plurality of wireless communication devices including the wireless communication device, and acquires data included in a reception signal; a detector that detects a retransmission request for requesting retransmission of the data, the retransmission request being transmitted by another wireless communication device by using a channel in accordance with a position of the other wireless communication device, and that identifies the position of the other wireless communication device based on a channel in which the retransmission request has been detected; a determination unit that determines whether or not to relay data to the other wireless communication device in accordance with a distance to the position identified by the detector; and a transmitter that transmits the data acquired by the reception controller to the other wireless communication device when the determination unit determines to relay data.

10 Claims, 10 Drawing Sheets

(56) References Cited

U.S. PATENT DOCUMENTS

| | | | |
|---|---|---|---|
| 2012/0003940 A1 | 1/2012 | Hirano et al. | |
| 2020/0396040 A1* | 12/2020 | Miao | H04W 4/40 |
| 2021/0021536 A1* | 1/2021 | Ganesan | H04L 1/1874 |
| 2021/0021974 A1* | 1/2021 | Kim | H04W 4/12 |
| 2021/0036821 A1* | 2/2021 | Chen | H04L 5/0094 |
| 2021/0120372 A1* | 4/2021 | Kalhan | H04W 28/02 |
| 2021/0297199 A1* | 9/2021 | Miao | H04W 72/20 |
| 2021/0377993 A1* | 12/2021 | Ayaz | H04L 5/0094 |

FOREIGN PATENT DOCUMENTS

| | | |
|---|---|---|
| JP | 2011-120049 A | 6/2011 |
| WO | 2010/110191 A1 | 9/2010 |

OTHER PUBLICATIONS

3GPP TS 36.211 V16.0.0, 3rd Generation Partnership Project; Technical Specification Group Radio Access Network; Evolved Universal Terrestrial Radio Access (E-UTRA); Physical channels and modulation (Release 16), Dec. 2019.
3GPP TS 36.212 V16.0.0, 3rd Generation Partnership Project; Technical Specification Group Radio Access Network; Evolved Universal Terrestrial Radio Access (E-UTRA); Multiplexing and channel coding (Release 16), Dec. 2019.
3GPP TS 36.213 V16.0.0, 3rd Generation Partnership Project; Technical Specification Group Radio Access Network; Evolved Universal Terrestrial Radio Access (E-UTRA); Physical layer procedures (Release 16), Dec. 2019.
3GPP TS 36.300 V16.0.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description;Stage 2 (Release 16), Dec. 2019.
3GPP TS 36.321 V15.8.0, 3rd Generation Partnership Project; Technical Specification Group Radio Access Network; Evolved Universal Terrestrial Radio Access (E-UTRA); Medium Access Control (MAC) protocol specification (Release 15), Dec. 2019.
3GPP TS 36.322 V15.3.0, 3rd Generation Partnership Project; Technical Specification Group Radio Access Network; Evolved Universal Terrestrial Radio Access (E-UTRA); Radio Link Control (RLC) protocol specification (Release 15), Sep. 2019.
3GPP TS 36.323 V15.5.0, 3rd Generation Partnership Project; Technical Specification Group Radio Access Network; Evolved Universal Terrestrial Radio Access (E-UTRA); Packet Data Convergence Protocol (PDCP) specification (Release 15), Dec. 2019.
3GPP TS 36.331 V15.8.0, 3rd Generation Partnership Project; Technical Specification Group Radio Access Network; Evolved Universal Terrestrial Radio Access (E-UTRA); Radio Resource Control (RRC); Protocol specification (Release 15), Dec. 2019.
3GPP TS 36.413 V16.0.0, 3rd Generation Partnership Project; Technical Specification Group Radio Access Network; Evolved Universal Terrestrial Radio Access Network (E-UTRAN); S1 Application Protocol (S1AP) (Release 16), Dec. 2019.
3GPP TS 36.423 V16.0.0, 3rd Generation Partnership Project; Technical Specification Group Radio Access Network; Evolved Universal Terrestrial Radio Access Network (E-UTRAN); X2 application protocol (X2AP) (Release 16), Dec. 2019.
3GPP TS 36.425 V15.0.0, 3rd Generation Partnership Project; Technical Specification Group Radio Access Network; Evolved Universal Terrestrial Radio Access Network (E-UTRAN); X2 interface user plane protocol (Release 15), Jun. 2018.
3GPP TS 37.340 V16.0.0, 3rd Generation Partnership Project; Technical Specification Group Radio Access Network; Evolved Universal Terrestrial Radio Access (E-UTRA) and NR; Multi-connectivity; Stage 2 (Release 16), Dec. 2019.
3GPP TS 38.201 V16.0.0, 3rd Generation Partnership Project; Technical Specification Group Radio Access Network; NR; Physical layer; General description (Release 16), Dec. 2019.
3GPP TS 38.202 V16.0.0, 3rd Generation Partnership Project; Technical Specification Group Radio Access Network; NR; Services provided by the physical layer (Release 16), Dec. 2019.
3GPP TS 38.211 V16.0.0, 3rd Generation Partnership Project; Technical Specification Group Radio Access Network; NR; Physical channels and modulation (Release 16), Dec. 2019.
3GPP TS 38.212 V16.0.0, 3rd Generation Partnership Project; Technical Specification Group Radio Access Network; NR; Multiplexing and channel coding (Release 16), Dec. 2019.
3GPP TS 38.213 V16.0.0, 3rd Generation Partnership Project; Technical Specification Group Radio Access Network; NR; Physical layer procedures for control (Release 16), Dec. 2019.
3GPP TS 38.214 V16.0.0, 3rd Generation Partnership Project; Technical Specification Group Radio Access Network; NR; Physical layer procedures for data (Release 16), Dec. 2019.
3GPP TS 38.215 V16.0.1, 3rd Generation Partnership Project; Technical Specification Group Radio Access Network; NR; Physical layer measurements (Release 16), Jan. 2020.
3GPP TS 38.300 V16.0.0, 3rd Generation Partnership Project; Technical Specification Group Radio Access Network; NR; NR and NG-RAN Overall Description; Stage 2 (Release 16), Dec. 2019.
3GPP TS 38.321 V15.8.0, 3rd Generation Partnership Project; Technical Specification Group Radio Access Network; NR; Medium Access Control (MAC) protocol specification (Release 15), Dec. 2019.
3GPP TS 38.322 V15.5.0, 3rd Generation Partnership Project; Technical Specification Group Radio Access Network; NR; Radio Link Control (RLC) protocol specification (Release 15), Mar. 2019.
3GPP TS 38.323 V15.6.0, 3rd Generation Partnership Project; Technical Specification Group Radio Access Network; NR; Packet Data Convergence Protocol (PDCP) specification (Release 15), Jun. 2019.
3GPP TS 38.331 V15.8.0, 3rd Generation Partnership Project; Technical Specification Group Radio Access Network; NR; Radio Resource Control (RRC) protocol specification (Release 15), Dec. 2019.
3GPP TS 38.401 V16.0.0, 3rd Generation Partnership Project; Technical Specification Group Radio Access Network; NG-RAN; Architecture description (Release 16), Dec. 2019.
3GPP TS 38.410 V16.0.0, 3rd Generation Partnership Project; Technical Specification Group Radio Access Network; NG-RAN; NG general aspects and principles (Release 16), Dec. 2019.
3GPP TS 38.413 V16.0.0, 3rd Generation Partnership Project; Technical Specification Group Radio Access Network; NG-RAN; NG Application Protocol (NGAP) (Release 16), Dec. 2019.
3GPP TS 38.420 V15.2.0, 3rd Generation Partnership Project; Technical Specification Group Radio Access Network; NG-RAN; Xn general aspects and principles (Release 15) Dec. 2018.
3GPP TS 38.423 V16.0.0, 3rd Generation Partnership Project; Technical Specification Group Radio Access Network; NG-RAN; Xn application protocol (XnAP) (Release 16), Dec. 2019.
3GPP TS 38.470 V16.0.0, 3rd Generation Partnership Project; Technical Specification Group Radio Access Network; NG-RAN; F1 general aspects and principles (Release 16), Dec. 2019.
3GPP TS 38.473 V16.0.0, 3rd Generation Partnership Project; Technical Specification Group Radio Access Network; NG-RAN; F1 application protocol (F1AP) (Release 16), Dec. 2019.
3GPP TR 38.801 V14.0.0, 3rd Generation Partnership Project; Technical Specification Group Radio Access Network; Study on new radio access technology: Radio access architecture and interfaces (Release 14) Mar. 2017.
3GPP TR 38.802 V14.2.0, 3rd Generation Partnership Project; Technical Specification Group Radio Access Network; Study on New Radio Access Technology Physical Layer Aspects (Release 14) Sep. 2017.
3GPP TR 38.803 V14.2.0, 3rd Generation Partnership Project; Technical Specification Group Radio Access Network; Study on new radio access technology: Radio Frequency (RF) and co-existence aspects (Release 14), Sep. 2017.
3GPP TR 38.804 V14.0.0, 3rd Generation Partnership Project; Technical Specification Group Radio Access Network; Study on New Radio Access Technology; Radio Interface Protocol Aspects (Release 14), Mar. 2017.

(56) References Cited

OTHER PUBLICATIONS

3GPP TR 38.900 V15.0.0, 3rd Generation Partnership Project; Technical Specification Group Radio Access Network; Study on channel model for frequency spectrum above 6 GHz (Release 15) Jun. 2018.
3GPP TR 38.912 V15.0.0, 3rd Generation Partnership Project; Technical Specification Group Radio Access Network; Study on New Radio (NR) access technology (Release 15), Jun. 2018.
3GPP TR 38.913 V15.0.0, 3rd Generation Partnership Project; Technical Specification Group Radio Access Network; Study on Scenarios and Requirements for Next Generation Access Technologies; (Release 15), Jun. 2018.
International Search Report and Written Opinion of the International Searching Authority issued by the Japan Patent Office for corresponding International Patent Application No. PCT/JP2020/001786, mailed on Feb. 25, 2020, with a partial English translation.

* cited by examiner

FIG.2

| F31 | F30 | F29 | F28 | F27 | F26 | F25 | F24 | F31 | F30 | F29 | F28 | F27 | F26 | F25 | F24 | F31 | F30 | F29 | F28 | F27 | F26 | F25 | F24 |
|---|---|---|---|---|---|---|---|---|---|---|---|---|---|---|---|---|---|---|---|---|---|---|---|
| F23 | F22 | F21 | F20 | F19 | F18 | F17 | F16 | F23 | F22 | F21 | F20 | F19 | F18 | F17 | F16 | F23 | F22 | F21 | F20 | F19 | F18 | F17 | F16 |
| F15 | F14 | F13 | F12 | F11 | F10 | F9 | F8 | F15 | F14 | F13 | F12 | F11 | F10 | F9 | F8 | F15 | F14 | F13 | F12 | F11 | F10 | F9 | F8 |
| F7 | F6 | F5 | F4 | F3 | F2 | F1 | F0 | F7 | F6 | F5 | F4 | F3 | F2 | F1 | F0 | F7 | F6 | F5 | F4 | F3 | F2 | F1 | F0 |

| RELATIVE ZONE OF TARGET UE | RELATIVE ZONE OF RELAY UE |
|---|---|
| F1 | F2, F8, F10 |
| F2 | F1, F3, F10, F11, F12, F13, F14 |
| F3 | F1, F2, F4, F5, F13, F14, F15 |
| F4 | F3, F5, F14, F15, F16, F17, F18 |
| F5 | F4, F6, F18 |
| ⋮ | ⋮ |
| F24 | F1, F7, F8, F9, F10, F22, F23 |

WIRELESS COMMUNICATION DEVICE, WIRELESS COMMUNICATION SYSTEM, AND WIRELESS COMMUNICATION METHOD

CROSS-REFERENCE TO RELATED APPLICATION

This application is a continuation of International Application No. PCT/JP2020/001786, filed on Jan. 20, 2020, the entire contents of which are incorporated herein by reference.

FIELD

The embodiments discussed herein are related to a wireless communication device, a wireless communication system, and a wireless communication method.

BACKGROUND

In a current network, traffic of mobile terminals (smartphones and feature phones) occupies most of resources of the network. Furthermore, traffic used by the mobile terminals tends to expand in the future.

In contrast, it is demanded to support service having various requirements in accordance with the development of Internet of Things (IoT) service (e.g., traffic system and monitoring system such as smart meter and device). Therefore, in a communication standard of the fifth generation mobile communication (5G or New Radio (NR)), a technique for achieving a higher data rate, larger capacity, and lower delay is demanded in addition to standard techniques of the fourth generation mobile communication (4G). The standard techniques include, for example, 3GPP TS 36.211 V16.0.0 (2019 December), 3GPP TS 36.212 V16.0.0 (2019 December), 3GPP TS 36.213 V16.0.0 (2019 December), 3GPP TS 36.300 V16.0.0 (2019 December), 3GPP TS 36.321 V15.8.0 (2019 December), 3GPP TS 36.322 V15.3.0 (2019 September), 3GPP TS 36.323 V15.5.0 (2019 December), 3GPP TS 36.331 V15.8.0 (2019 December), 3GPP TS 36.413 V16.0.0 (2019 December), 3GPP TS 36.423 V16.0.0 (2019 December), and 3GPP TS 36.425 V15.0.0 (2018 June).

Note that 3GPP working groups (e.g., TSG-RAN WG1 and TSG-RAN WG2) have conducted technical studies for the fifth generation communication standard, and the first edition of a standard specification was published in January, 2017 (3GPP TS 37.340 V16.0.0 (2019 December), 3GPP TS 38.201 V16.0.0 (2019 December), 3GPP TS 38.202 V16.0.0 (2019 December), 3GPP TS 38.211 V16.0.0 (2019 December), 3GPP TS 38.212 V16.0.0 (2019 December), 3GPP TS 38.213 V16.0.0 (2019 December), 3GPP TS 38.214 V16.0.0 (2019 December), 3GPP TS 38.215 V16.0.1 (2020 January), 3GPP TS 38.300 V16.0.0 (2019 December), 3GPP TS 38.321 V15.8.0 (2019 December), 3GPP TS 38.322 V15.5.0 (2019 March), 3GPP TS 38.323 V15.6.0 (2019 June), 3GPP TS 38.331 V15.8.0 (2019 December), 3GPP TS 38.401 V16.0.0 (2019 December), 3GPP TS 38.410 V16.0.0 (2019 December), 3GPP TS 38.413 V16.0.0 (2019 December), 3GPP TS 38.420 V15.2.0 (2018 December), 3GPP TS 38.423 V16.0.0 (2019 December), 3GPP TS 38.470 V16.0.0 (2019 December), 3GPP TS 38.473 V16.0.0 (2019 December), 3GPP TR 38.801 V14.0.0 (2017 March), 3GPP TR 38.802 V14.2.0 (2017 September), 3GPP TR 38.803 V14.2.0 (2017 September), 3GPP TR 38.804 V14.0.0 (2017 March), 3GPP TR 38.900 V15.0.0 (2018 June), 3GPP TR 38.912 V15.0.0 (2018 June), and 3GPP TR 38.913 V15.0.0 (2018 June)).

As described above, in order to support various pieces of service, supports for many use cases are assumed in 5G. The use cases are classified into enhanced mobile broad band (eMBB), massive machine type communications (MTC), and ultra-reliable and low latency communication (URLLC).

Furthermore, the 3GPP working groups discuss new radio vehicle to everything (NR-V2X) communication. NR-V2X is a generic term for, for example, vehicle to vehicle (V2V), vehicle to pedestrian (V2P), vehicle to infrastructure (V2I), and vehicle to network (V2N). In V2V, communication between vehicles is performed by using a sidelink channel. In V2P, communication is performed between a vehicle and a pedestrian. In V2I, communication is performed between a vehicle and road infrastructure such as a sign. In V2N, communication is performed between a vehicle and a network. For example, 3GPP TS 22.186 V16.2.0 (2019 June) describes the definition regarding V2X.

An arrangement method, in which a control channel (physical sidelink control channel: PSCCH) and a data channel (physical sidelink shared channel: PSSCH) are subjected to time division multiplexing (TDM) or frequency division multiplexing (FDM), is used for resource arrangement in NR-V2X. Note that, for example, sidelink control information (SCI) is mapped to resources of the PSCCH. The SCI includes, for example, information on a modulation method and coding rate of data of a corresponding PSSCH. Furthermore, a feedback channel (physical sidelink feedback channel: PSFCH) has been introduced to improve sidelink channel quality.

In V2X, it is considered that a group of wireless communication devices is formed and broadcast to a group, in which data is transmitted to each wireless communication device in the group, is frequently executed. That is, for example, wireless communication devices of vehicles and pedestrians located in a predetermined range form a group, and the traveling direction and behavior of each vehicle are shared in a group by the broadcast to a group. Furthermore, wireless communication devices of road infrastructure, vehicles, and pedestrians form a group. The vehicles and pedestrians in the group are notified of an alarm and an instruction from the road infrastructure by the broadcast to a group.

In such a case, data may fail to be correctly transmitted or received due to propagation loss between, for example, wireless communication devices which are distant from each other. That is, some wireless communication devices in the group may not receive data broadcast to the group depending on wireless line quality. Then, it is conceivable that a wireless communication device that has received the data transfers and relays the data to another wireless communication device in the group.

There is, however, a problem that it is difficult to determine a wireless communication device to relay data in the group. Specifically, for example, when a representative wireless communication device such as a cluster header determined in a group fixed as a relay station, appropriate relay may be difficult depending on the wireless line quality between the wireless communication device and the other wireless communication device. Furthermore, there has been no specific study example regarding a method of adaptively determining a relay station in a group. In particular, when a wireless communication system based on V2X is not connected to a network and, for example, only wireless communication devices of vehicles and pedestrians form a group, the network does not designate a relay station. Therefore, it is demanded to autonomously determine a relay station in a group, which makes it difficult to achieve appropriate data relay.

SUMMARY

According to an aspect of an embodiment, a wireless communication device includes, a reception controller that receives a signal transmitted to a plurality of wireless communication devices including the wireless communication device, and acquires data included in a reception signal, a detector that detects a retransmission request for requesting retransmission of the data, the retransmission request being transmitted by another wireless communication device by using a channel in accordance with a position of the other wireless communication device, and that identifies the position of the other wireless communication device based on a channel in which the retransmission request has been detected, a determination unit that determines whether or not to relay data to the other wireless communication device in accordance with a distance to the position identified by the detector, and a transmitter that transmits the data acquired by the reception controller to the other wireless communication device when the determination unit determines to relay data.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 illustrates a specific example of zone division;

FIG. 9 illustrates a specific example of relative zone setting according to a second embodiment; and FIG. 10 illustrates a specific example of a relay zone table.

DESCRIPTION OF EMBODIMENTS

Preferred embodiments of the present invention will be explained with reference to accompanying drawings. Note that the embodiments do not limit the present invention.

[a] First Embodiment

Figure 1:
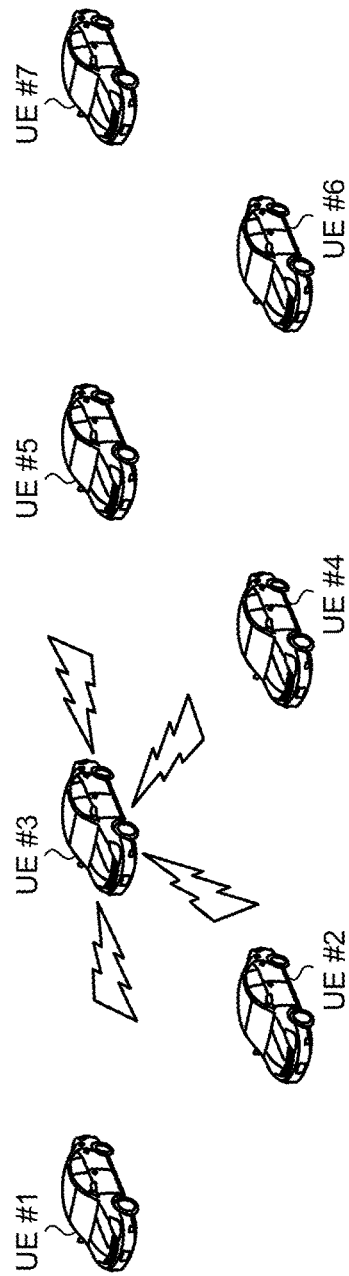
FIG. 1 illustrates a specific example of a wireless communication system according to a first embodiment.

FIG. 1 illustrates a specific example of a wireless communication system according to a first embodiment. As illustrated in FIG. 1, the wireless communication system includes terminal devices UE #1 to #7 mounted on a plurality of vehicles. The terminal devices UE #1 to #7 belong to the same group, and are allowed to wirelessly communicate with each other. That is, for example, when the terminal device UE #3 broadcasts data to a group, the terminal devices UE #1, #2, and #4 to #7 receive the data. Specifically, the terminal device #UE3 transmits control information such as sidelink control information (SCI) through a control channel such as a physical sidelink control channel (PSCCH), and announces information on a data channel such as a physical sidelink shared channel (PSSCH) used for data transmission in a group. The terminal devices UE #1, #2, and #4 to #7 other than the terminal device UE #3 identify a data channel including the data by receiving and decoding the control information of the control channel. Then, when the terminal device UE #3 transmits data through the data channel, the terminal devices UE #1, #2, and #4 to #7 receive and decode the data of the data channel.

In this case, some terminal devices fail to decode the data transmitted by the terminal device UE #3 depending on wireless line quality. That is, for example, the terminal device UE #7 far away from the terminal device UE #3 fails to decode data that has been broadcast to a group, and fails to obtain correct data. Note that, since the control channel is transmitted with higher reliability than the data channel, each terminal device correctly decodes the control information even under poor wireless line quality. Therefore, for example, the terminal device UE #7 may fail to decode a data channel despite that fact that the terminal device UE #7 succeeds in decoding the control channel and identifying the data channel from the control information.

In such a case, the terminal device UE #7 that has failed in decoding the data channel transmits NAK requesting retransmission of data. Specifically, the terminal device UE #7 transmits the NAK through a feedback channel such as a physical sidelink feedback channel (PSFCH). That is, for example, when a data channel such as a PSSCH is not correctly received even though a control channel such as a PSCCH is correctly received, the terminal device UE #7 feeds back the NAK. In contrast, the terminal devices UE #1, #2, and #4 to #6 that have correctly received both the control channel and the data channel do not feed back anything. Radio resources used as a feedback channel are defined in accordance with the positions of the terminal devices UE #1 to #7.

Specifically, a place where the wireless communication system in FIG. 1 is constructed is divided into zones in accordance with geographical coordinates as illustrated in FIG. 2, for example. That is, for example, 32 rectangular zones F0 to F31 each having a predetermined size are repeatedly arranged on, for example, a road on which the wireless communication system is constructed. Since the sizes and position coordinates of these zones are known, the terminal devices UE #1 to #7 are allowed to determine in which zone the terminal devices UE #1 to #7 themselves are located by identifying the position coordinates of the terminal devices UE #1 to #7 themselves with, for example, a global positioning system (GPS). Then, the radio resources used as a feedback channel are defined in association with zones where the terminal devices UE #1 to #7 are located. Thus, in the above-described example, for example, the terminal device UE #7 transmits NAK by using a feedback channel corresponding to a zone where the terminal device UE #7 itself is located. The correspondence relation between the zones and the radio resources used as a feedback channel may be preliminarily determined, or may be designated by the control information of the control channel.

In contrast, the terminal devices UE #1, #2, and #4 to #6 that have succeeded in decoding the data channel monitor the feedback channel. When detecting that any terminal device has transmitted NAK, the terminal devices UE #1, #2, and #4 to #6 identify a zone where the terminal device of a transmission source of the NAK is located. That is, here, a zone where the terminal device UE #7 is located is identified from the radio resources of the feedback channel in which the NAK has been detected. Then, the terminal devices UE #1, #2, and #4 to #6 that have detected the NAK calculate the difference between the distance between the terminal device UE #3 which have transmitted data and the terminal device UE #7, and the distance between the terminal devices UE #1, #2, and #4 to #6 themselves and the terminal device UE #7, and compares the calculated distance difference with a predetermined threshold. The predetermined threshold may be preliminarily determined in the wireless communication system, or may be designated by the control information of the control channel. As a result of the comparison, when the distance difference satisfies a predetermined condition, the terminal devices UE #1, #2, and #4 to #6 transmit reception data obtained by decoding the data channel to the terminal device UE #7 as retransmission data. At this time, the terminal devices UE #1, #2, and #4 to #6 to transmit retransmission data by using the same radio resources. The radio resources used for transmission of the retransmission data may be preliminarily determined, or may be designated by the control information of the control channel.

As described above, the terminal devices UE #1, #2, and #4 to #6, which receive the NAK and have the distance difference satisfying the predetermined condition, relay and transmits the data received from the terminal device UE #3 to the terminal device UE #7 of a transmission source of the NAK. Then, the terminal device UE #7 improves a data decoding result by performing soft-combining, such as chase combining, of the first transmission data received from the terminal device UE #3 and the retransmission data received from the terminal devices UE #1, #2, and #4 to #6.

Figure 3:
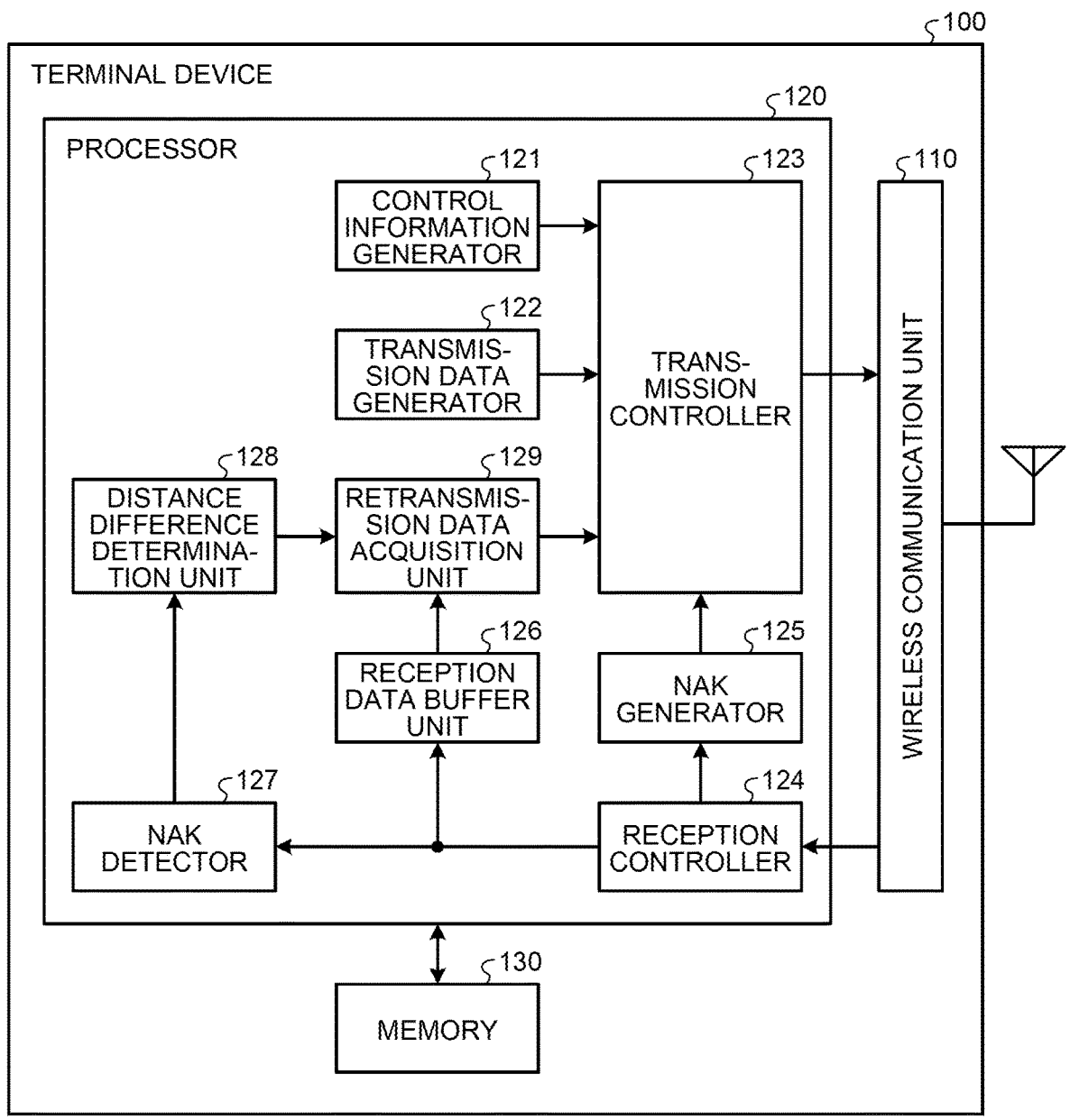
FIG. 3 is a block diagram illustrating the configuration of a terminal device according to the first embodiment.

FIG. 3 is a block diagram illustrating the configuration of a terminal device 100 having a configuration equivalent to those of the terminal devices UE #1 to #7. The terminal device 100 includes a wireless communication unit 110, a processor 120, and a memory 130.

The wireless communication unit 110 transmits and receives signals to and from other wireless communication devices. Specifically, the wireless communication unit 110 performs predetermined wireless transmission processing on a transmission signal, and wirelessly transmits the transmission signal to a wireless communication device such as another terminal device and a base station device via an antenna. Furthermore, the wireless communication unit 110 wirelessly receives a signal via an antenna, and performs predetermined wireless reception processing on a reception signal.

The processor 120 includes, for example, a central processing unit (CPU), a field programmable gate array (FPGA), and a digital signal processor (DSP), and integrally controls the entire terminal device 100. Specifically, the processor 120 includes a control information generator 121, a transmission data generator 122, a transmission controller 123, a reception controller 124, a NAK generator 125, a reception data buffer unit 126, a NAK detector 127, a distance difference determination unit 128, and a retransmission data acquisition unit 129.

The control information generator 121 generates control information such as SCI. The control information generated by the control information generator 121 may include position information on the terminal device 100, information on a data encoding rate and a modulation method, information identifying radio resources of a data channel used for data transmission, information identifying radio resources used for data retransmission, and the like. The position information on the terminal device 100 may be information for identifying a zone where the terminal device 100 is located, or may be position coordinates of the terminal device 100 measured by, for example, a GPS.

The transmission data generator 122 generates transmission data to be broadcast to wireless communication devices in a group. The transmission data generated by the transmission data generator 122 is the first transmission data to be first transmitted.

The transmission controller 123 encodes and modulates the control information and the transmission data and maps the control information and the transmission data to radio resources to generate a transmission signal. That is, the transmission controller 123 maps the control information to the control channel and maps the transmission data to the data channel to generate the transmission signal. Furthermore, when the NAK generator 125 generates NAK, the transmission controller 123 maps the NAK to a feedback channel corresponding to a zone where the terminal device 100 is located, and causes the wireless communication unit 110 to transmit the NAK. Moreover, when the retransmission data acquisition unit 129 acquires retransmission data, the transmission controller 123 maps the retransmission data to retransmission radio resources, and makes the wireless communication unit 110 to transmit the retransmission data.

The reception controller 124 acquires a reception signal from the wireless communication unit 110, and executes reception processing on the reception signal. Specifically, the reception controller 124 demodulates and decodes a control channel to acquire control information, and demodulates and decodes a data channel in accordance with the control information. When decoding fails as a result of decoding the data channel, the reception controller 124 notifies the NAK generator 125 of the failure. In contrast, when the decoding of the data channel is successful, the reception controller 124 outputs the reception data obtained by the decoding to the reception data buffer unit 126. Moreover, when the decoding of the data channel is successful, the reception controller 124 demodulates and decodes a feedback channel corresponding to a time slot of the data channel and each zone.

When the reception controller 124 notifies the NAK generator 125 of failure of data decoding, the NAK generator 125 generates NAK requesting data retransmission. Then, the NAK generator 125 outputs the generated NAK to the transmission controller 123.

The reception data buffer unit 126 temporarily holds the reception data obtained by the decoding performed by the reception controller 124. At this time, the reception data buffer unit 126 temporarily holds the control information obtained by decoding the control channel together with the reception data obtained by decoding the data channel.

The NAK detector 127 monitors the feedback channel decoded by the reception controller 124, and detects NAK from a decoding result of the feedback channel for each zone. That is, the NAK detector 127 detects the NAK from a feedback channel corresponding to a zone where another wireless communication device that has failed in data decoding is located. At this time, the NAK detector 127 identifies a zone where the wireless communication device of a transmission source of the NAK is located. Specifically, the NAK detector 127 identifies a zone where the transmission source of the NAK is located by determining as a feedback channel of which zone radio resource in which the NAK has been detected are used.

The distance difference determination unit 128 calculates a distance between the wireless communication device of a transmission source of data and a zone where the terminal device of a transmission source of the NAK is located. That is, notification of position information on a terminal device of a transmission source of data is given by control information from the transmission source of data, and the NAK detector 127 identifies a zone where a transmission source of the NAK is located. Thus, the distance difference determination unit 128 calculates a distance between a transmission source of data and a zone where a transmission source of the NAK is located. Furthermore, the distance difference determination unit 128 calculates a distance between the terminal device 100 itself and a zone where the terminal device of a transmission source of the NAK is located. Note that the distance between the transmission source of data or the terminal device 100 itself and a zone is a distance from the transmission source of data or the terminal device 100 itself to a predetermined point in the zone. For example, the position coordinates of the center point of the zone may be used for calculating the distance, or the position coordinates of the vertex of the zone farthest from or closest to the transmission source of data or the terminal device 100 itself may be used for calculating the distance.

Then, the distance difference determination unit 128 calculates the difference between the calculated distances, and determines whether or not to relay data to the terminal device of a transmission source of the NAK by comparing the calculated distance difference and a predetermined threshold. Specifically, when the distance difference obtained by subtracting the distance between the terminal device 100 itself and a zone of a transmission source of the NAK from the distance between the wireless communication device of a transmission source of data and the zone of a transmission source of the NAK is equal to or greater than a predetermined threshold, the distance difference determination unit 128 determines to relay the data. In contrast, when the calculated distance difference is less than the predetermined threshold, the distance difference determination unit 128 determines not to relay data.

When the distance difference determination unit 128 determines to relay data, the retransmission data acquisition unit 129 acquires retransmission data from the reception data buffer unit 126. Specifically, the retransmission data acquisition unit 129 acquires the reception data and the control information held in the reception data buffer unit 126 as retransmission data. Then, the retransmission data acquisition unit 129 outputs the acquired retransmission data to the transmission controller 123. Note that, when the control information acquired from the reception data buffer unit 126 includes an index indicating first transmission and retransmission of data, the retransmission data acquisition unit 129 changes the index such that the index indicates retransmission, and then sets the reception data and the control information as retransmission data. Retransmission radio resources used for transmission of the retransmission data may be preliminarily determined, or may be designated by the control information.

The memory 130 includes, for example, a random access memory (RAM) or a read only memory (ROM), and stores information used for processing performed by the processor 120.

Then, a wireless communication method in a wireless communication system including the terminal devices UE #1 to #7, which are equivalent to the above-described terminal device 100, will be described with reference to the sequence diagram in FIG. 4. A wireless communication method in the case where the terminal device UE #3 broadcasts data to a group will be described below.

The UE #3 broadcasts control information to a group through a control channel (Step S101). That is, the control information generated by the control information generator 121 of the UE #3 is transmitted to the UE #1, #2, and #4 to #7. The control information includes position information on the UE #3, information identifying radio resources of a data channel used for data transmission, and the like. The UE #1, #2, and #4 to #7 perform reception processing on the data channel in accordance with the control information. Furthermore, the UE #3 broadcasts transmission data to a group through a data channel (Step S102). That is, the transmission data generated by the transmission data generator 122 of the UE #3 is transmitted to the UE #1, #2, and #4 to #7.

Here, since the control channel is transmitted with higher reliability than the data channel, the UE #1, #2, and #4 to #7 in a group correctly decode the control information. In contrast, the UE #1, #2, and #4 to #6 in the group correctly decode the transmission data, but the UE #7 does not correctly decode the transmission data. That is, for example, as illustrated in FIG. 5, since the UE #7 is located relatively far from the UE #3 and the wireless environment is poor, the UE #7 fails in receiving the transmission data transmitted from the UE #3.

Figure 5:
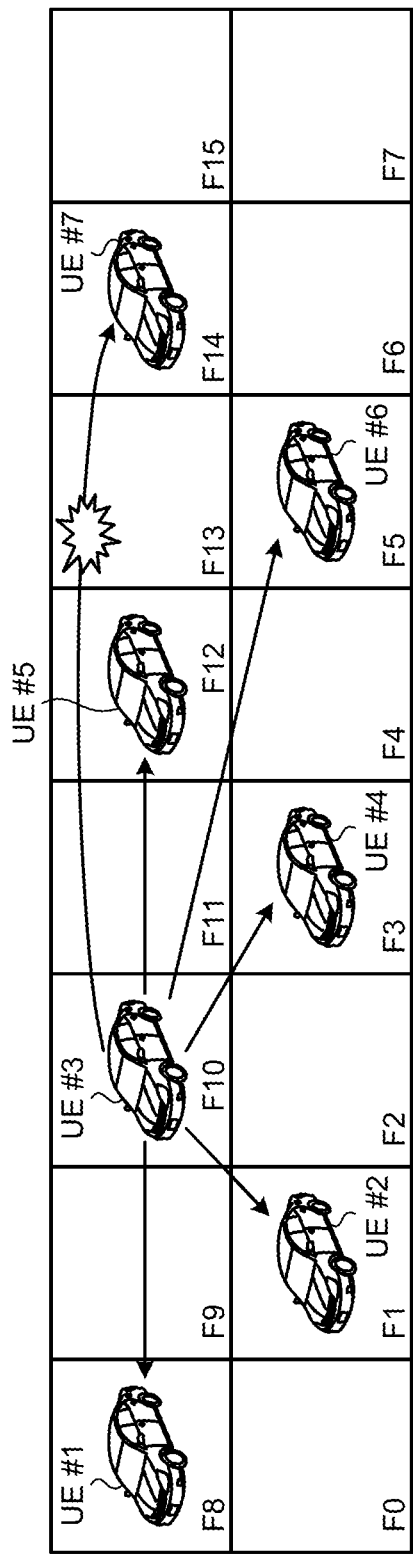
FIG. 5 illustrates one example of broadcast to a group.

Furthermore, as illustrated in FIG. 5, the UE #3 is located in the zone F10, and the other UE #1, #2, and #4 to #7 are also located in the zones in FIG. 5. The UE #3 gives notification of the position information of the UE #3 itself by control information. The control information may be information for identifying the zone F10, or may be the position coordinates of the UE #3 measured by, for example, a GPS. The control information including such position information allows the UE #1, #2, and #4 to #7 to grasp the position of the UE #3 of a transmission source of data.

Figure 4:
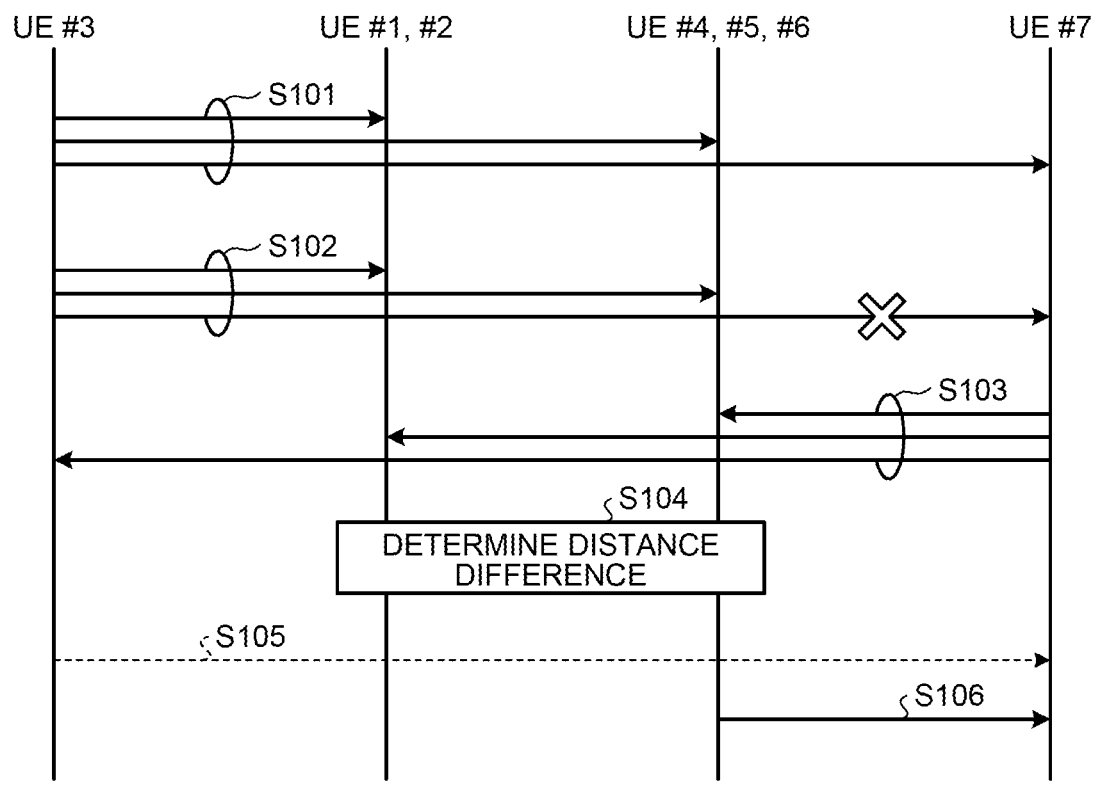
FIG. 4 is a sequence diagram illustrating a wireless communication method according to the first embodiment.

Note that, although the transmission of control information (Step S101) and the transmission of transmission data (Step S102) are illustrated separately for convenience in FIG. 4, the control information and the transmission data may be simultaneously transmitted by using different radio resources.

The UE #7 that has failed in receiving data transmits NAK requesting data retransmission through a feedback channel (Step S103). At this time, the UE #7 identifies a zone where the UE #7 is located by performing positioning with, for example, a GPS, and transmits NAK by using a feedback channel corresponding to the zone. That is, radio resources used as a feedback channel are different for each zone, and the UE #7 transmits NAK by using radio resources corresponding to the zone where the UE #7 is located.

Figure 6:
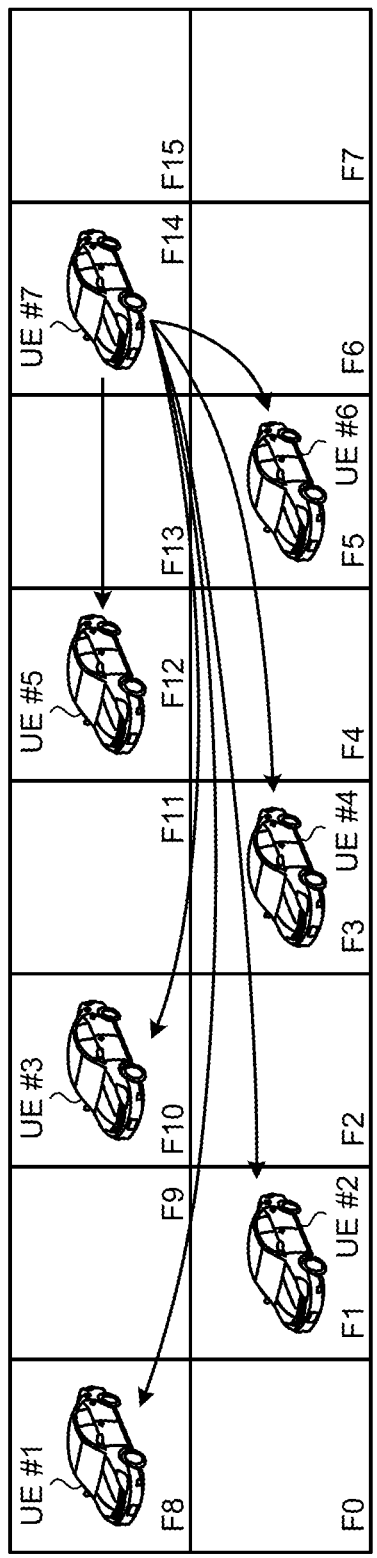
FIG. 6 illustrates one example of feedback.

In contrast, the UE #1, #2, and #4 to #6 that have succeeded in receiving data monitor the feedback channel corresponding to each zone without transmitting ACK indicating that the data has been successfully received. That is, the UE #1, #2, and #4 to #6 perform reception processing on a feedback channel for each zone without performing transmission processing using the feedback channel. Therefore, the UE #1, #2, and #4 to #6 receive NAK in a feedback channel corresponding to the zone where the UE #7 is located. That is, for example, as illustrated in FIG. 6, the NAK detectors 127 of the UE #1, #2, and #4 to #6 detect NAK from a feedback channel corresponding to the zone F14 where the UE #7 is located. Furthermore, the NAK detector 127 of the UE #3 of a transmission source of data also detects NAK.

As described above, since the UE #1, #2, and #4 to #6 that have succeeded in receiving data do not transmit ACK by using a feedback channel, the UE #1 to #6 is allowed to monitor the presence or absence of NAK by performing reception processing on the feedback channel even when each of the UE #1 to #7 performs half duplex.

Here, since the NAK detectors 127 of the UE #1 to #6 detect NAK from the feedback channel corresponding to the zone F14, the distance difference determination units 128 of the UE #1, #2, and #4 to #6 excluding the UE #3 of a transmission source of data determine the distance difference (Step S104). Specifically, the distance between the UE #3 of a transmission source of data and the zone F14 where the UE #7 of transmission source of NAK (hereinafter, referred to as "transmission/reception distance") is calculated while the distance between each of the UE #1, #2, and #4 to #6 and the zone F14 where the UE #7 is located (hereinafter, referred to as "relay candidate distance") is calculated. Then, data is determined to be relayed in the UE #1, #2, and #4 to #6 in which a distance difference obtained by subtracting the relay candidate distance from the transmission/reception distance is equal to or greater than a predetermined threshold.

The predetermined threshold compared with the distance difference is a real number. When the predetermined threshold is a positive real number, the UE #1, #2, and #4 to #6, in which the relay candidate distance is smaller than the transmission/reception distance, relay data. That is, when the predetermined threshold is a positive real number, a terminal device that relays data is allowed to be limited to a terminal device closer to the zone F14 than the UE #3 of a transmission source of data. Furthermore, when the predetermined threshold is a negative real number, the UE #1, #2, and #4 to #6, in which the relay candidate distance is greater than the transmission/reception distance, relay data. That is, when the predetermined threshold is a negative real number, the terminal device farther from the zone F14 than the UE #3 of a transmission source of data may relay data.

Here, the description will be continued assuming that the predetermined threshold is zero or a positive real number. In this case, as a result of determination of the distance difference determination unit 128 of each of the UE #1, #2, and #4 to #6, for example, the distance difference determination units 128 of the UE #1 and #2 determine not to relay data, and for example, the distance difference determination units 128 of the UE #4 to #6 determine to relay data. That is, the UE #1 and #2 located farther from the zone F14 than the UE #3 do not relay data, and the UE #4 to #6 located closer to the zone F14 than the UE #3 relay data.

Figure 7:
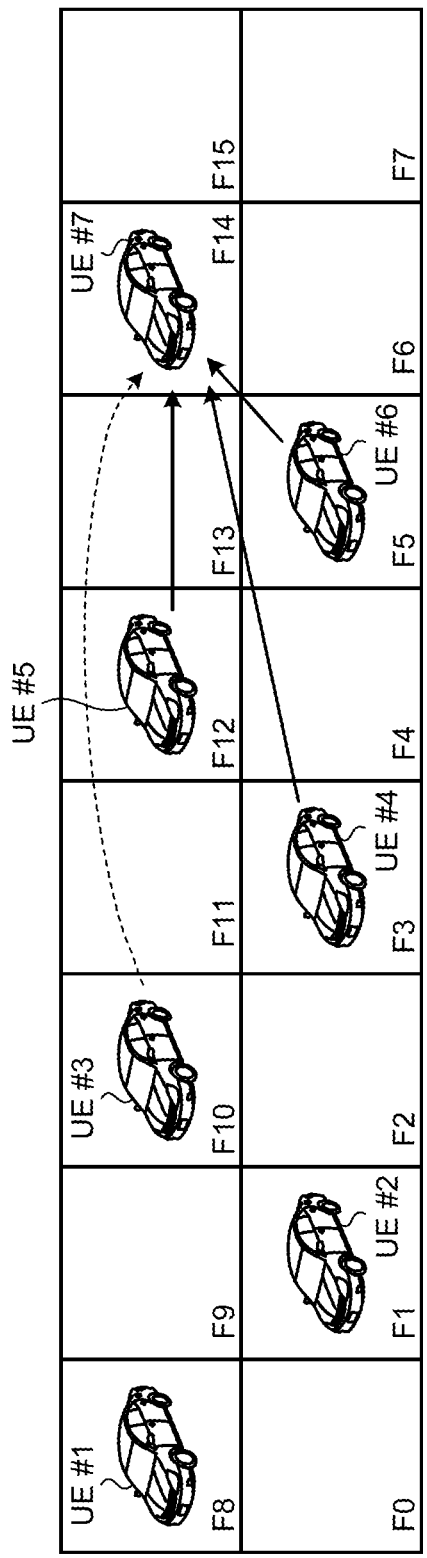
FIG. 7 illustrates one example of data relay.

Then, the UE #4 to #6 transmit the data, which has been received from the UE #3 and decoded, to the UE #7 (Step S106). That is, the data and the control information held in the reception data buffer units 126 of the UE #4 to #6 are set as retransmission data. The retransmission data is transmitted to the UE #7 of a transmission source of NAK. Specifically, for example, as illustrated in FIG. 7, the UE #4 to #6 simultaneously transmit the retransmission data to the UE #7 by using retransmission radio resources about which notification is given by the control information. Here, since the NAK detector 127 of the UE #3 also detects NAK from the UE #7, the UE #3 of a transmission source of data may retransmit the data requested to be retransmitted by using the same retransmission radio resources (Step S105).

Since the distances between each of the UE #4 to #6 and the UE #7 are different, retransmission data reception timings in the UE #7 do not coincide with each other even when the UE #4 to #6 simultaneously transmit retransmission data. Note, however, that, when the shift between the retransmission data reception timings is smaller than the size of cyclic prefix (CP), pieces of retransmission data from the UE #4 to #6 do not interfere with each other, and SNR gain and diversity gain are improved. Accuracy of decoding data is allowed to be improved. Furthermore, the UE #7 is allowed to further improve the decoding accuracy by performing soft combining of the first transmission data for which decoding has failed and the retransmission data.

As described above, the NAK from the UE #7 is received, and the UE #4 to #6, in which the distance difference between the transmission/reception distance and the relay candidate distance satisfies a predetermined condition, transmit the retransmission data, whereby a terminal device located relatively closer to the zone F14 where the UE #7 is located relays data from the UE #3. Thus, a terminal device in a wireless environment in which data is allowed to be relayed to the UE #7 is allowed to adaptively relay data from the UE #3, and is allowed to appropriately and efficiently relay data. Furthermore, terminal devices that relay data are limited depending on a condition of the distance difference, which allows prevention of an excessive increase in the number of terminal devices that relay data and inhibition of an increase in interference and an increase in in-band radiation due to transmission of retransmission data. Moreover, it is also possible to prevent an excessive increase in the number of the terminal devices that relay data based on the positional relation between the terminal devices.

Figure 8:
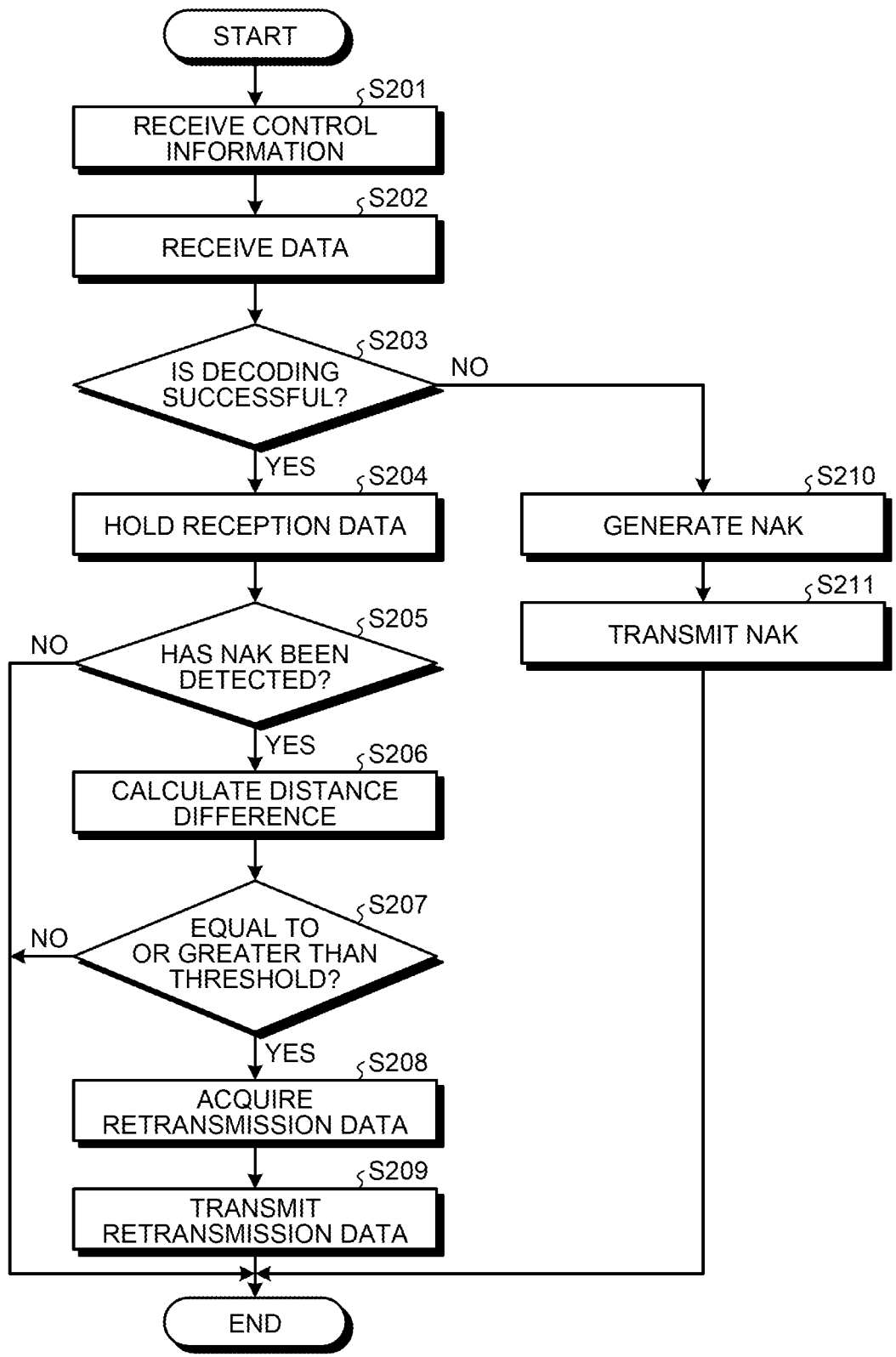
FIG. 8 is a flowchart illustrating the operation of a terminal device according to the first embodiment.

Next, an operation in the case where the terminal device 100 having a configuration equivalent to those of the terminal devices UE #1 to #7 receives data will be described with reference to the flowchart in FIG. 8.

When the wireless communication unit 110 receives a signal, the reception controller 124 demodulates and decodes a control channel, and control information is acquired (Step S201). The control information includes position information on a wireless communication device of a transmission source of the signal, information identifying radio resource resources used as various channels, and the like. Then, the reception controller 124 demodulates and decodes a data channel, and thereby reception data is acquired (Step S202). At this time, the reception controller 124 determines whether or not the data channel has been successfully decoded (Step S203). When the decoding fails (Step S203 No), the NAK generator 125 generates NAK (Step S210). The NAK is transmitted via the transmission controller 123 and the wireless communication unit 110 by using a feedback channel corresponding to a zone where the terminal device 100 is located (Step S211).

In contrast, when the data channel has been successfully decoded (Step S203 Yes), the reception data buffer unit 126 holds the reception data (Step S204). In this case, the reception data buffer unit 126 holds control information corresponding to the reception data. Then, the NAK detector 127 monitors a feedback channel for each zone (Step S205). When NAK is not detected from the feedback channel corresponding to any zone (Step S205 No), the processing ends without relaying the reception data.

In contrast, when NAK is detected from a feedback channel corresponding to any zone (Step S205 Yes), a zone where a wireless communication device of a transmission source of the NAK is identified. That is, the NAK detector 127 determines a feedback channel corresponding to which zone radio resources in which the NAK has been detected is, and the zone where a transmission source of the NAK is located is identified. Then, the distance difference determination unit 128 calculates the distance difference between the transmission/reception distance and the relay candidate distance (Step S206). The transmission/reception distance is a distance between a transmission source of data and the zone where a transmission source of NAK is located. The relay candidate distance is a distance between the terminal device 100 and the zone where a transmission source of NAK is located. Moreover, the distance difference determination unit 128 compares the distance difference obtained by subtracting the relay candidate distance from the transmission/reception distance with a predetermined threshold (Step S207). When the distance difference is less than the threshold (Step S207 No), the processing ends without relaying the reception data.

In contrast, when the distance difference is equal to or greater than the predetermined threshold (Step S207 Yes), the retransmission data acquisition unit 129 acquires the reception data and the control information from the reception data buffer unit 126 as retransmission data (Step S208). The retransmission data is transmitted via the transmission controller 123 and the wireless communication unit 110 (Step S209). That is, when the NAK detector 127 detects NAK and the distance from the terminal device 100 to the transmission source of the NAK satisfies a condition, the reception data held in the reception data buffer unit 126 is relayed.

As described above, a terminal device, in which the distance difference satisfies a predetermined condition, among terminal devices that detect NAK relays reception data, so that a transmission source of the NAK that has failed in decoding data is allowed to receive retransmission data and improve data decoding accuracy. Furthermore, a terminal device located relatively close to the transmission source of the NAK transmits retransmission data, which allows efficient data relay and inhibition of an increase in interference and an increase in in-band radiation due to retransmission data.

As described above, according to the present embodiment, a terminal device that has failed in decoding data which has been broadcast to a group transmits NAK by using a feedback channel corresponding to a zone where the terminal device itself is located. Then, when detecting the NAK in a feedback channel for each zone, a terminal device that has succeeded in decoding data transmits decoded reception data as retransmission data in the case where the distance difference between the distance from the transmission source of data to the transmission source of NAK and the distance from the terminal device itself to the transmission source of the NAK satisfies a predetermined condition. Therefore, a terminal device, in which the distance from the transmission source of the NAK satisfies a condition, in a range where the NAK is allowed to be received from the transmission source of the NAK relays the reception data. As a result, terminal devices in the appropriate number in a wireless environment in which data is allowed to be relayed is allowed to adaptively relay data, and is allowed to appropriately and efficiently relay data.

[b] Second Embodiment

A feature of a second embodiment is that a relative zone based on a transmission source of data is set and that selection of a feedback channel and calculation of a distance are executed by using the set relative zone.

The configurations of a wireless communication system and a terminal device according to the second embodiment are similar to those of the first embodiment (FIGS. 1 and 3), and thus the description thereof will be omitted. In the second embodiment, when a terminal device transmits data, a relative zone is set based on the terminal device. That is, when control information including position information on a transmission source of data is transmitted, the terminal device that receives the control information sets a relative zone as illustrated in, for example, FIG. 9 based on the position information on the transmission source of data.

Figure 9:
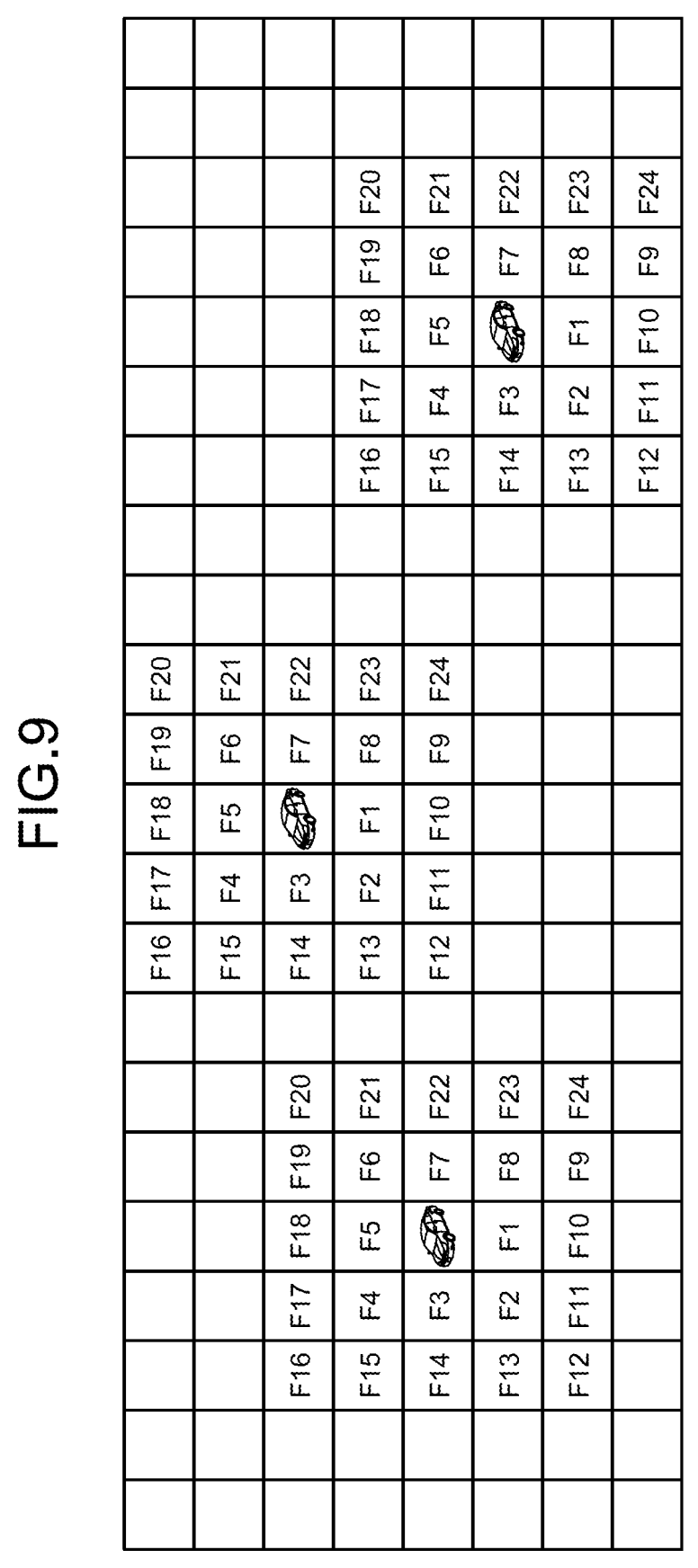

In the example in FIG. 9, 24 rectangular relative zones F1 to F24 each having a predetermined size are set around the position of the transmission source of data. A method of setting such relative zones and the size of each relative zone are preliminarily stored in each terminal device. Therefore, when the terminal device of a transmission source of data announces the position information by the control information, each terminal device is allowed to set the above-described relative zones F1 to F24 from the announced position information. Note that the position information on the transmission source of data may be position coordinates measured by a GPS, or may be information for identifying a zone corresponding to geographical coordinates used in the first embodiment.

In the present embodiment, when a NAK generator 125 generates NAK, a transmission controller 123 identifies a relative zone where a terminal device 100 itself is located from the position of the transmission source of data and the position of the terminal device 100 itself, maps the NAK to a feedback channel corresponding to the relative zone, and transmits the feedback channel from a wireless communication unit 110. The correspondence relation between the relative zones and the radio resources used as a feedback channel may be preliminarily determined, or may be designated by the control information of the control channel.

Furthermore, a NAK detector 127 monitors the feedback channel decoded by a reception controller 124, and detects NAK from a decoding result of the feedback channel for each relative zone. Then, the NAK detector 127 identifies a relative zone where the wireless communication device of a transmission source of the NAK is located. Specifically, the NAK detector 127 identifies a relative zone where the transmission source of the NAK is located by determining as a feedback channel of which relative zone radio resource in which the NAK has been detected are used.

A distance difference determination unit 128 calculates a distance between a transmission source of data and a relative zone where the transmission source of the NAK is located. Furthermore, the distance difference determination unit 128 calculates a distance between the terminal device 100 itself and a relative zone where the terminal device of a transmission source of the NAK is located. Note that the distance between the transmission source of data or the terminal device 100 itself and a relative zone is a distance from the transmission source of data or the terminal device 100 itself to a predetermined point in the relative zone. For example, the position coordinates of the center point of the relative zone may be used for calculating the distance, or the position coordinates of the vertex of the relative zone farthest from or closest to the transmission source of data or the terminal device 100 itself may be used for calculating the distance.

Then, the distance difference determination unit 128 calculates the difference between the calculated distances, and determines whether or not to relay data to the terminal device of a transmission source of the NAK by comparing the calculated distance difference and a predetermined threshold. Specifically, when the distance difference obtained by subtracting the distance between the terminal device 100 itself and a relative zone of a transmission source of the NAK from the distance between the wireless communication device of a transmission source of data and the relative zone of a transmission source of the NAK is equal to or greater than a predetermined threshold, the distance difference determination unit 128 determines to relay data. In contrast, when the calculated distance difference is less than the predetermined threshold, the distance difference determination unit 128 determines not to relay data.

As described above, a relative zone is set and a distance between terminal devices is calculated, whereby correct distance difference is allowed to be calculated, and accuracy of determination regarding the presence or absence of data relay is allowed to be improved. That is, in zone arrangement based on geographical coordinates in the first embodiment, for example, as illustrated in FIG. 2, a plurality of (e.g., 32) zones is set as a unit, and zones in one unit are repeatedly arranged. Therefore, there are a plurality of zones having the same identification information, and the distance between the terminal devices may fail to be correctly calculated.

In contrast, in the case of relative zones based on a transmission source of data, different pieces of identification information are allowed to be given to all relative zones based on a transmission source of one piece of data by setting the relative zones such that the relative zones cover a range where data is allowed to be received. As a result, the distance between terminal devices is correctly calculated, and the accuracy of determination using distance difference is allowed to be improved.

As described above, according to the present embodiment, a relative zone based on a transmission source of data is arranged, a feedback channel for NAK transmission is selected by using the relative zone, and distance difference is determined by using the relative zone. Therefore, the distance between terminal devices is allowed to be accurately calculated, and the accuracy of determination regarding the distance difference is allowed to be improved.

Note that, in the second embodiment, the distance difference between the distance from a transmission source of data to a relative zone where a transmission source of NAK is located and the distance from a terminal device that may relay data to the relative zone where the transmission source of NAK is located is calculated, and the presence or absence of data relay is determined. When the relative zone based on the transmission source of data is set, however, a relative zone where a terminal device that relays data is located may be preliminarily determined in accordance with the relative zone where the transmission source of NAK is located. That is, since the distance from the transmission source of data to each relative zone is always constant, a relative zone where a terminal device that relays data (hereinafter, referred to as "relay UE") to a terminal device which is a target of data retransmission (hereinafter, referred to as "target UE") may be defined for each relative zone where the target UE is located.

Specifically, for example, as illustrated in FIG. 10, each terminal device may hold a relay zone table indicating the correspondence relation between a relative zone where a target UE is located and a relative zone where a relay UE is located. Then, the terminal device determines whether or not the terminal device itself is located in the relative zone of the relay UE by identifying the relative zone where the target UE is located from a feedback channel in which NAK has been detected and referring to the relay zone table. The terminal device relays data to the target UE when the terminal device itself is located in the relative zone of the relay UE.

In the relay zone table in FIG. 10, relative zones having a shorter distance to the relative zone where the target UE is located than the transmission source of data in relative zone setting in FIG. 9 is defined as a zone of the relay UE. For example, when the target UE is located in the relative zone F1, a terminal device located in the relative zones F2, F8, or F10 closer to the relative zone F1 than a transmission source of data serves as relay UE. Furthermore, when the target UE is located in the relative zone F24, a terminal device located in the relative zones F1, F7, F8, F9, F10, F22, or F23 closer to the relative zone F24 than a transmission source of data serves as relay UE.

Note that, although, in each of the above-described embodiments, a wireless communication system in which a plurality of terminal devices is not connected to a network has been described, a relay method similar to that in each of the above-described embodiments is also allowed to be applied to a wireless communication system that has a plurality of terminal devices connected to a network and wirelessly communicates with, for example, a base station device. That is, for example, when the base station device broadcasts data to a group of a plurality of terminal devices, a terminal device that has failed in decoding data may transmit NAK by using a feedback channel in accordance with the position of the terminal device itself, and a terminal device that has succeeded in decoding data and satisfies a condition may relay data. As described above, even when the wireless communication system is connected to a network, a terminal device that has detected NAK is allowed to autonomously serve as a relay station to relay data without designation of a relay station from the network.

According to one aspect of the wireless communication device, the wireless communication system, and the wireless communication method disclosed in the present application, an effect of appropriately and efficiently relaying data is achieved.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. A wireless communication device comprising:
 a reception controller that receives a signal transmitted to a plurality of wireless communication devices including the wireless communication device, and acquires data included in a reception signal;
 a detector that detects a retransmission request for requesting retransmission of the data, the retransmission request being transmitted by another wireless communication device by using a channel in accordance with a position of the other wireless communication device, and that identifies the position of the other wireless communication device based on a channel in which the retransmission request has been detected;

a determination unit that determines whether or not to relay data to the other wireless communication device in accordance with a distance to the position identified by the detector; and a transmitter that transmits the data acquired by the reception controller to the other wireless communication device when the determination unit determines to relay data.

2. The wireless communication device according to claim 1, wherein the detector detects the retransmission request transmitted by using a feedback channel for each zone set in accordance with a geographical coordinate, and identifies a zone corresponding to the feedback channel in which the retransmission request has been detected.

3. The wireless communication device according to claim 2, wherein the determination unit calculates a distance difference between a distance from a transmission source of the data to the zone identified by the detector and a distance from the wireless communication device to the zone identified by the detector, and determines whether or not to relay data to the other wireless communication device by comparing the distance difference and a predetermined threshold.

4. The wireless communication device according to claim 1, wherein the detector detects the retransmission request transmitted by using a feedback channel for each relative zone set based on a position of a transmission source of the data, and identifies a relative zone corresponding to the feedback channel in which the retransmission request has been detected.

5. The wireless communication device according to claim 4, wherein the determination unit calculates a distance difference between a distance from a transmission source of the data to the relative zone identified by the detector and a distance from the wireless communication device to the relative zone identified by the detector, and determines whether or not to relay data to the other wireless communication device by comparing the distance difference and a predetermined threshold.

6. The wireless communication device according to claim 1, wherein the reception controller further acquires control information included in the reception signal, and the transmitter transmits data acquired by the reception controller by using a retransmission radio resource designated by the control information.

7. A wireless communication device comprising:

a reception controller that receives a signal transmitted to a plurality of wireless communication devices including the wireless communication device, and acquires data included in a reception signal;

a transmitter that, when the reception controller fails in acquire the data, transmits a retransmission request for requesting retransmission of the data by using a channel in accordance with a position of the wireless communication device; and a reception unit that receives the data from another wireless communication device among the plurality of wireless communication devices, the other wireless communication device having detected the retransmission request, a distance of the other wireless communication device to the position of the wireless communication device satisfying a predetermined condition.

8. The wireless communication device according to claim 7, wherein the transmitter transmits a retransmission request by using a feedback channel corresponding to a zone where the wireless communication device is located among a plurality of feedback channels for a plurality of zones set in accordance with a geographical coordinate.

9. The wireless communication device according to claim 7, wherein the transmitter transmits the retransmission request by using a feedback channel corresponding to a relative zone where the wireless communication device is located among a plurality of feedback channels for a plurality of relative zones set based on a position of a transmission source of the data.

10. A wireless communication system comprising: a transmission device; a first wireless communication device; and a second wireless communication device, wherein the transmission device includes a wireless transmitter that transmits a signal including data to the first wireless communication device and the second wireless communication device, the first wireless communication device includes:

a first reception controller that receives the signal transmitted from the transmission device, and acquires data included in a reception signal;

a detector that detects a retransmission request for requesting retransmission of the data, the retransmission request being transmitted by the second wireless communication device by using a channel in accordance with a position of the second wireless communication device, and that identifies the position of the second wireless communication device based on a channel in which the retransmission request has been detected;

a determination unit that determines whether or not to relay data to the second wireless communication device in accordance with a distance to the position identified by the detector; and a first transmitter that transmits the data acquired by the first reception controller to the second wireless communication device when the determination unit determines to relay data, and the second wireless communication device includes:

a second reception controller that receives the signal transmitted from the transmission device, and acquires data included in a reception signal;

a second transmitter that, when the second reception controller fails in acquire the data, transmits a retransmission request for requesting retransmission of the data by using a channel in accordance with the position of the second wireless communication device; and a reception unit that receives the data from the first wireless communication device.

* * * * *